United States Patent [19]

Holtkamp, Jr.

[11] Patent Number: 5,282,335
[45] Date of Patent: Feb. 1, 1994

[54] SELF-WATERING DISH GARDEN FOR PLANTS

[76] Inventor: Reinhold Holtkamp, Jr., P.O. Box 78565, 1501 Lischey Ave., Nashville, Tenn. 37207-8565

[21] Appl. No.: 845,152

[22] Filed: Mar. 3, 1992

[51] Int. Cl.⁵ .............................................. A01G 25/00
[52] U.S. Cl. ................................... 47/81; 47/70; 47/84; 47/85
[58] Field of Search ................ 47/81, 79, 84, 41.11

[56] References Cited

U.S. PATENT DOCUMENTS

| | | | |
|---|---|---|---|
| 3,165,863 | 1/1965 | Duran | 47/70 |
| 3,555,729 | 1/1971 | Chute | 47/81 |
| 4,044,502 | 8/1977 | Hillenbrand | 47/41.11 |
| 4,226,048 | 10/1980 | Molnar | 47/81 |
| 4,663,884 | 5/1987 | Zeischegg | 47/79 |
| 4,745,707 | 5/1988 | Newby | 47/79 |
| 5,127,366 | 7/1972 | Kim | 47/79 |

FOREIGN PATENT DOCUMENTS

| | | | |
|---|---|---|---|
| 289885 | 10/1969 | Australia | 47/81 |
| 0182453 | 5/1986 | European Pat. Off. | 47/84 |
| 3440586 | 5/1986 | Fed. Rep. of Germany | 47/79 |
| 1039188 | 8/1966 | United Kingdom | 47/81 |
| 1192431 | 5/1970 | United Kingdom | 47/81 |

*Primary Examiner*—Henry E. Raduazo
*Attorney, Agent, or Firm*—Foley & Lardner

[57] ABSTRACT

A self-watering dish garden includes a lower container section which defines a liquid holding reservoir, an upper container section which fits on the lower container section and has an open top, and a tray which fits into the upper container section. The tray receives plant material in a growing medium and has a depth such that the bottom of the tray is above the top of the lower container section. The tray includes a supporting flange for supporting a partition which includes an outer rim and retaining members. At least one water absorbing member extends from the growing medium through the bottom of the tray into the liquid holding reservoir.

10 Claims, 4 Drawing Sheets

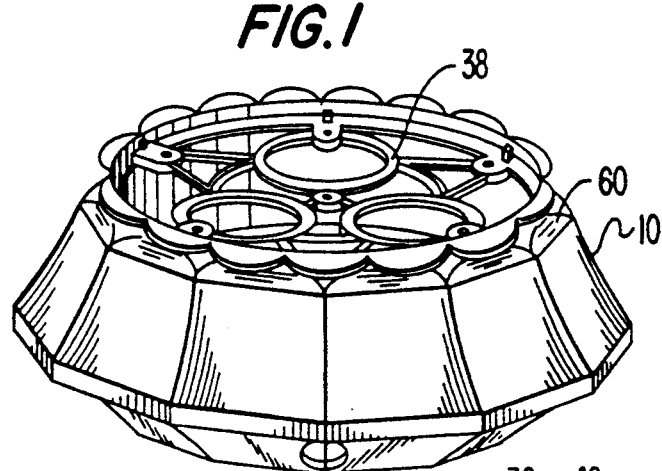
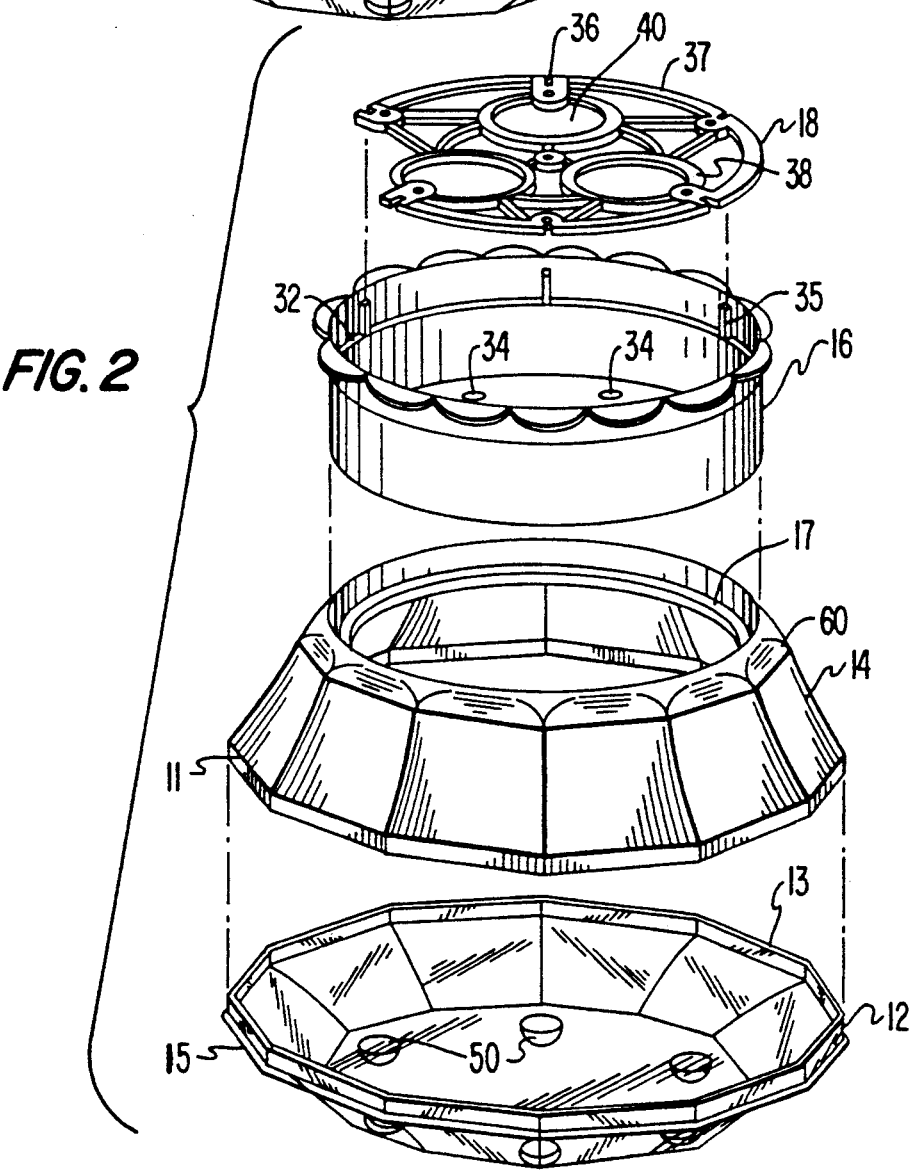

SELF-WATERING DISH GARDEN FOR PLANTS

BACKGROUND OF THE INVENTION

The present invention relates to a self-watering dish garden for plants, and relates more particularly to an inexpensive and efficient dish garden which is readily shippable in boxes.

Typical dish gardens today consist of a container usually made of a heavy ceramic material or perhaps a wicker basket with a thick plastic lining. These containers are relatively expensive and contribute to a large percentage of the cost of the dish garden.

Conventional dish gardens are watered from the top, because the nature of the container material, for example, ceramic or wicker basket lined with plastic, does not lend itself to bottom watering. There are many plants species, for example, African violets, in which bottom watering is greatly preferred. Top watering tends to result in overwatering of the plant, whereas bottom watering, if done properly, tends to provide sufficient moisture to the plant without the adverse effects of overwatering.

Another problem with conventional dish gardens and potted plants in general is the maintenance required. Generally, plants are watered periodically which means that one must be aware of when the plant was last watered and how much water the plant or plants require. Another problem with conventional dish gardens is that they are frequently assembled or arranged on site, and are transportable only with great care, for example, by hand-carrying. Conventionally arranged dish gardens are not adaptable to being shipped in boxes.

As is apparent from the foregoing, the problems of dish gardens relating to cost, bottom watering, ease of watering maintenance, and transportability, prior to the present invention, have not been solved. These problems, in turn, have led and can lead to both grower and customer dissatisfaction with dish gardens heretofore available.

SUMMARY OF THE INVENTION

With the above in mind, it is an object of the invention to provide a dish garden for plants having a substantially less expensive container.

Another object of the present invention is to provide a dish garden for plants which utilizes bottom watering.

It is a further object of the present invention to provide a dish garden for plants which is self-watering. The self-watering feature also includes a preferably transparent reservoir so the water level can be visually checked without disassembling the dish garden.

Another feature of the present invention is to provide a dish garden with a positioning means which provides a guide for planting the garden in order to achieve an attractive, well-balanced appearance.

Yet another feature of the invention is to provide a dish garden which is shippable in boxes. Not only are the plants and foliage protected, but the dish garden is prevented from tipping in the box.

Yet a further object of the invention is to provide a retaining means which prevents total dislocation of the soil material and plants from the garden if the shipping box is inadvertently inverted.

A still further feature of the present invention is to provide a dish garden which is adaptable to receiving individual pots if desired.

These and other objects of the invention are achieved by providing a dish garden in which a lower container section defines a reservoir for holding plant watering liquid, an upper container section fits on the lower container section and has an open top for receiving a tray containing plant material, and a tray for holding plant material in a growing medium fits in the upper container section. The tray has a plurality of holes in its bottom and its depth is such that the bottom of the tray is located above the top of the lower container section. A partition mounted in the tray includes an outer rim and retaining members which define openings in the partition. At least one water absorbing member extends from the tray into the reservoir in order to water the plant material by capillary action.

Further objects of the invention are achieved by additionally providing at least one shipping post extending from the partition upward above the plant material to permit shipping of the dish garden. The individual components of the dish garden are preferably made of a plastic material, and the lower container section may be transparent. Supporting feet may be provided on the lower container section, and the upper container section may be formed with a beveled wall for supporting the leaves of the plant material. A pot with plant material in a growing medium and an individual water absorbing member may be inserted into the partition, or the plant material and growing medium may be removed from the pot and positioned under the retaining member.

BRIEF DESCRIPTION OF THE DRAWINGS

FIG. 1 is a perspective view showing the dish garden of the present invention,

FIG. 2 is a perspective exploded view showing the main components of the dish garden.

DETAILED DESCRIPTION OF THE PREFERRED EMBODIMENTS

Figure 6:
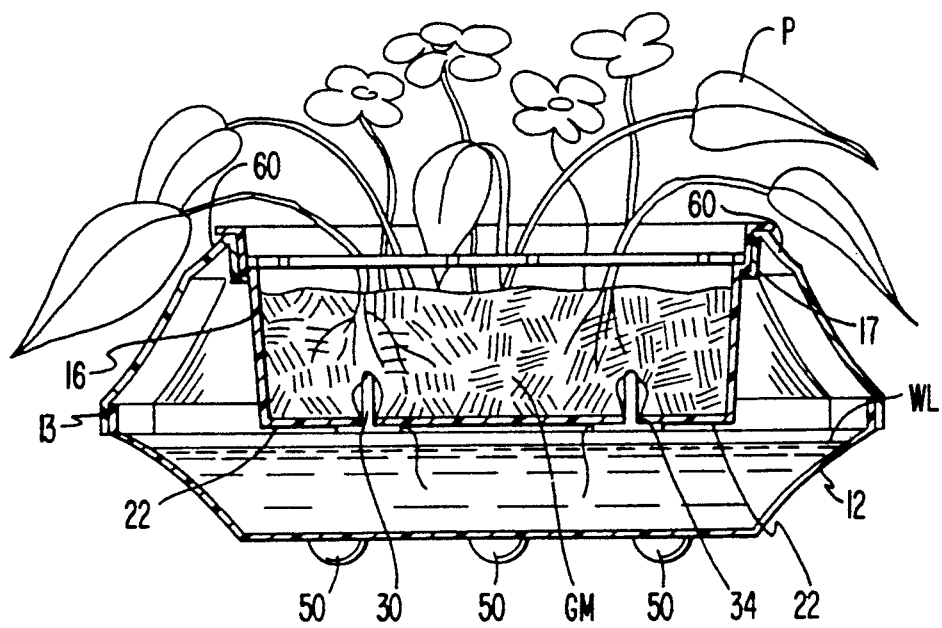
FIG. 6 is a cross-section of an embodiment of the dish garden with plant material arranged therein

The dish garden of the present invention is generally indicated at 10. As can best be seen from FIG. 2, the dish garden 10 comprises a lower container part or section 12, an upper container part or section 14, a tray 16, and a positioning means in the form of a partition 18. The lower section 12 is formed with an upper flange 13 and a ledge 15, the ledge 15 receiving the downwardly depending flange 11 of the upper section 14. The upper flange 3 of the lower section 12 fits inside the lower flange 11 of the upper section 14. The flanges are dimensioned so that the upper section frictionally fits snugly on the lower section but can be easily removed when it is desired to replenish the water supply in the reservoir formed by the lower section 12. The water level WL as shown in FIG. 6 is typically just below the top of the lower section 12 as defined by the flange 13, and is slightly spaced from the bottom 22 of the tray 16.

Formed in the open upper end of the upper section 14 is a tray supporting flange 17 adapted to receive and support a tray 16 containing growing media GM.

Figure 7:
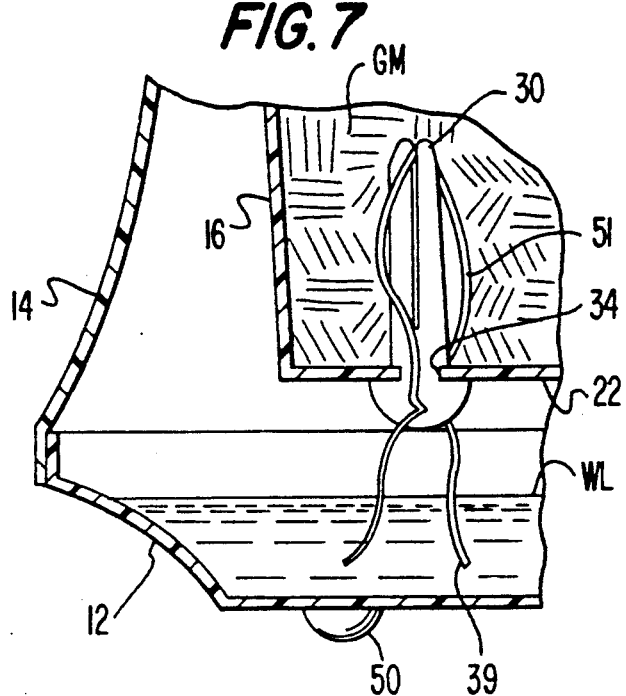
FIG. 7 is an enlarged fragmentary cross-section of the dish garden with plant material arranged therein and showing in greater detail the self-watering feature.

The bottom-watering and self-watering features of the invention are best described with reference to FIG. 7. The principle of bottom-watering and self-watering is described in my U.S. Pat. No. 4,996,792. The growing media GM containing the plant material is disposed in the tray 16. Water is transferred from the reservoir in the lower container section 12 by absorption to the bottom part 39 of a wick 51. By capillary action, water is transferred to the upper part of the wick 51 and into the growing media GM. The wick is carried by a wick insertion device 30 which extends through and is locked in an opening 34 formed in the bottom wall 22 of the tray. A plurality of small openings 34 are provided, two of which are shown in FIG. 2. The wick insertion device is described in my pending U.S. patent application Ser. No. 07/783,773, and reference is made thereto for a more detailed description.

Because the lower container section 12 is preferably transparent, one can easily, visually check the water level WL in the dish garden. When adding water, one need only lift the tray or, alternatively, lift the upper container section 14 which receives the tray, off the lower section. Water can then be added up to the water level WL, and the upper container section 14 can be lowered to again interconnect with the lower section 12.

As shown in FIGS. 2 and 6, the tray 16 receives the growing medium GM and the plant material P. The tray 16 has a plurality of holes 34 in the bottom wall 22 certain of which receive the wick insertion devices 30 described in the above-referenced co-pending patent application. The tray is sized so that the bottom wall 22 of the tray is positioned above the top of the lower container section 12. Being so sized, the bottom of the tray is always above the highest level of the water in the lower container section.

Figure 4:
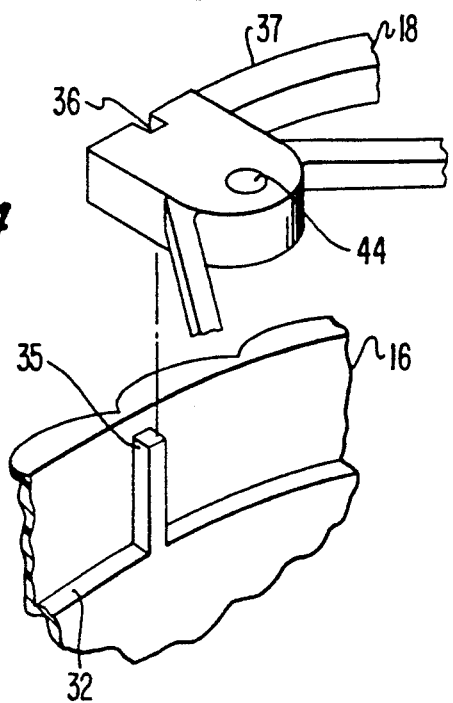
FIG. 4 is a detailed view of the manner of securing the partition to the tray.

Referring to FIGS. 2 and 4, the upper interior surface of the tray 16 is formed with several arcuately spaced ribs 35 which engage slots 36 formed in the partition 18. The partition can thus slide down the ribs 35 until the outer rim 37 of the partition 18 contacts the flange 32 of the tray 16. The fit between the ribs 35 and the slots 36 is a snug frictional fit, so that when the dish garden 10 is inverted, the partition is not displaced. In the embodiment shown, six ribs and corresponding slots are provided.

Figure 3:
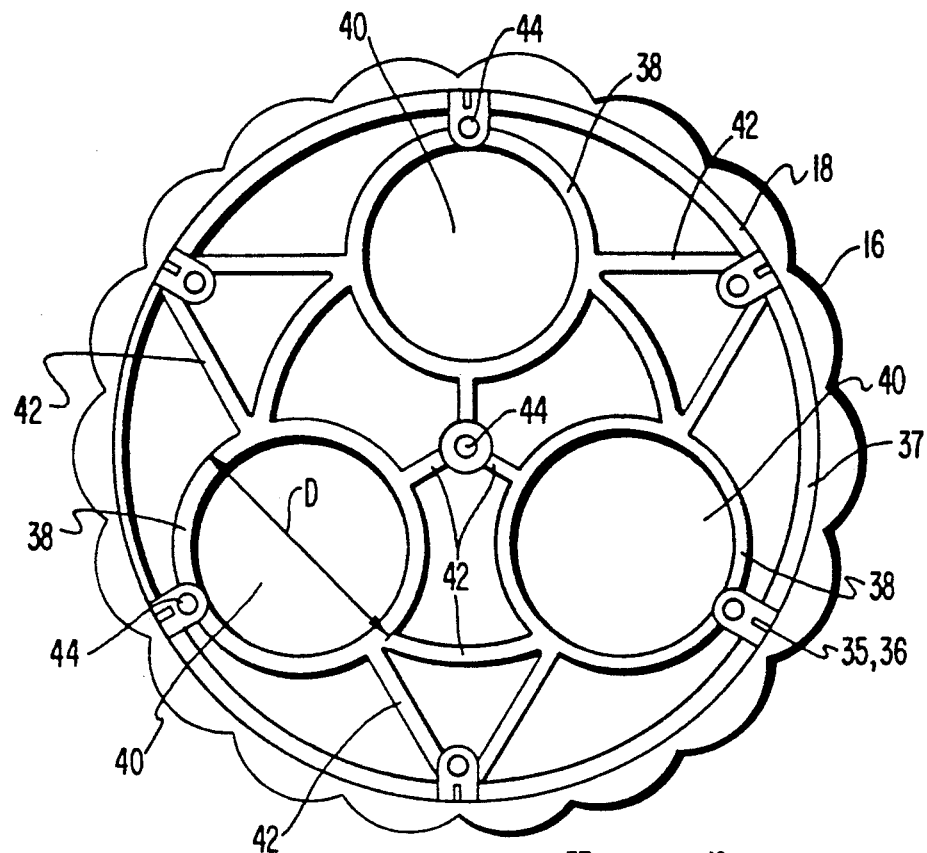
FIG. 3 is a top view of the tray and the partition.
Figure 5:
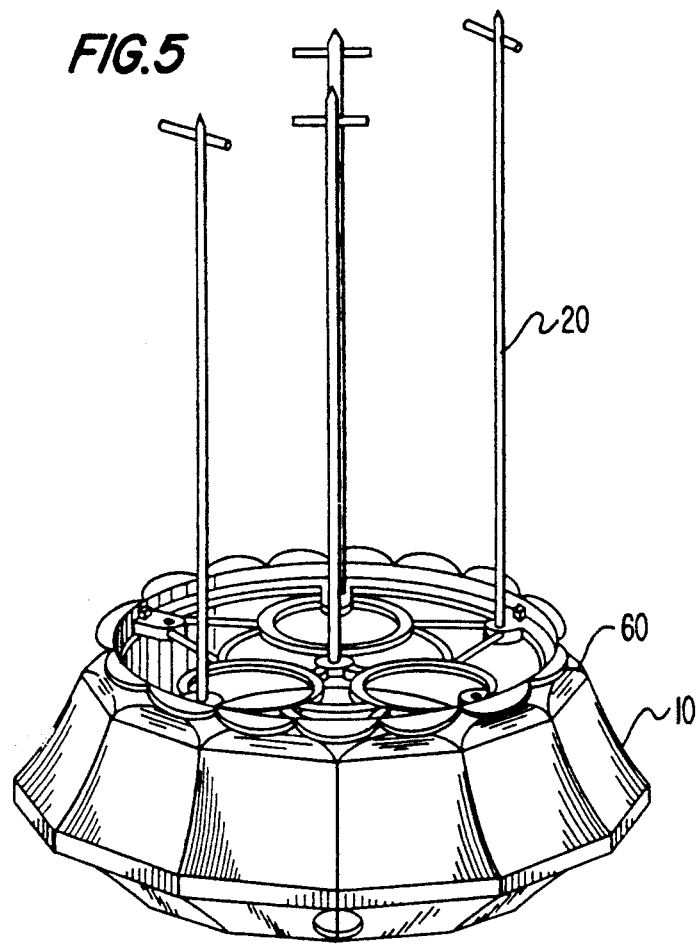
FIG. 5 is a perspective view of the dish garden with the shipping posts attached.

As shown in FIG. 3, the partition 18 includes retaining members 38 which define substantially equally spaced circular openings 40 in the partition. The retaining members 38 are connected to each other and to the rim 37 of the partition 18 by supporting members commonly designated at 42. Postholes 44 (see FIG. 4) are located around the partition inwardly of the slots 36 to receive shipping posts 20 shown in FIG. 5. The shipping posts 20 are long enough to reach above the plant material P, and their function will be described in more detail below.

The lower container section 12, upper container section 14, tray 16, partition 18, and shipping posts 20 are easily and preferably molded from a plastic material. The lower container section 12 is preferably transparent as noted above, to allow convenient visual inspection of the water level in the reservoir.

Referring to FIGS. 2 and 6, supporting feet 50 project downwardly from the bottom wall of the lower container section 12 so as to position the dish garden above a supporting surface. The supporting feet 50 inhibit moisture transfer from the dish garden to the supporting surface, and are preferably molded integrally with the lower container section 12.

The outer wall 60 of the upper container section 14 is upwardly and inwardly beveled as best shown in FIG. 6. The beveled wall 60 is continuous and forms a supporting surface for leaves of the plants P extending downwardly below the top of the tray.

In the embodiment of FIG. 6, the tray 16 is filled with growing medium GM after which the partition 18 is inserted into the tray 16 by engaging the ribs 35 of the tray in the slots 36 formed in the partition. Plant material P, rooted or in the form of plugs, for example, is then inserted into the tray 16 through the openings 40. The openings 40 enable one to quickly and accurately place the plant material P in the tray 16 so as to obtain a well-balanced appearance.

Figure 8:
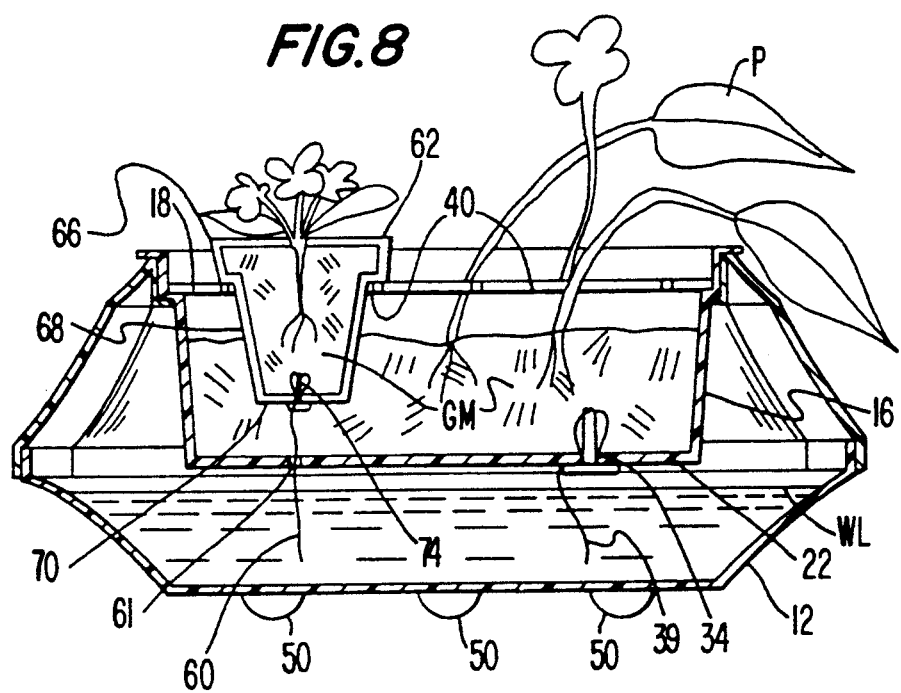
FIG. 8 is a view similar to FIG. 6 of the dish garden, but showing a separate pot supported by the partition.

In another use of the invention, the tray 16 is only partially filled with growing medium and the partition 18 is mounted on the tray. Plants in pots sized as shown in FIG. 8, wherein the pots have an inside diameter that is approximately equal to the outside diameter D (see FIG. 3) of the retaining members 38, are transplanted into the dish garden. The potted plant material is firmly bound as a result of being in a pot for a length of time and because of the binding action of the potted plant's roots. The growing medium and plant in the pot are thus removable in substantially one piece. The removed growing medium is then compressed by the fingers and inserted into one of the circular openings 40 of the partition, after which the growing medium expands back to its original larger size, that is, the size of the pot from whence it came. All of the circular openings 40 are potted in this manner.

The shipping posts 20 are then inserted into the postholes 44 and the dish garden is ready for shipment in a box. The shipping posts 20 are sized lengthwise to approximately contact the inside top of the shipping box. If the box is tilted during shipping, the shipping posts 20 will keep the dish garden from tilting inside the box and thus no damage to the plants will result. If the box is inadvertently turned upside down, the shipping posts will keep the dish garden in place thereby preventing damage to the plant material caused by crushing the plant material against the top of the box. Additionally, the retaining members 38 of the partition will tend to prevent the growing medium from falling out of the dish garden. Consequently, the dish garden is not damaged by being inadvertently inverted, and any dirt that escapes the tray can be easily replaced.

Yet another use of the dish garden is shown in FIG. 8, in which the partition 18 receives pots of plant material without transplanting the same. Pots 62 (only one of which is shown) having an upper section 66 with an outside diameter slightly larger than the inside diameter of the substantially equally spaced circular openings 40, a lower section 68 with a diameter smaller than the inside diameter of the openings 40, and a depth less than the depth of the tray 16, contain growing media and plant material. The bottom of the pot 70 has a hole in which is inserted the wick 60 and wick insertion device 74 of my U.S. Pat. No. 4,932,159. The tray 16 is formed with a plurality of further holes 61 which are located inside of and are smaller, than the holes 34 previously described. The smaller holes 61 are located approximately below the openings 40 of the partition 18. The wick 60 of the pot 62 is disposed through the hole 61 so as to reach the water in the lower container section 12. Consequently, the plant material in the pot 62 is bottom and self-watered through the action of the wick 60 and wick insertion device 74. In the embodiment of FIG. 8, one can insert as many pots 62 into the partition 18 as there are circular openings 40. Typically, the tray 16 may contain growing media and other plant material, and it may be desired to insert only one or two pots 62 into the tray. To do so, one simply reaches through the circular opening 40 and clears the growing media away from the hole 61 in the tray bottom. The wick 60 is then threaded into the hole 61 to reach the water in the lower container section 12. The pot 62 is then placed in the partition 18 and supported by the retaining members 38. In this way, one may combine plant material directly planted in the tray 16 with potted plant material. Although the plant material in the tray and pot is separated by the pot 62, the wick 60 of the pot and the separate wick 39 of the tray serve to self-water the separate plants.

Although the invention concepts are applicable to different sized containers, trays, and pots, a particularly efficient size dish garden has an overall diameter of about 15–16 cm where the lower and upper container sections join, a tray diameter of 13–14 cm, a tray depth of 3–4 cm, and an overall height (excluding shipping posts) of 6–7 cm. The circular openings 40 of the partition are approximately 4 cm in diameter and, as described, can be used either to receive potted plants or plant material to be transplanted into the growing medium in the tray.

Minor variations of the dish garden disclosed and illustrated will suggest themselves to those skilled in the art without, however, departing from the concepts of the invention as defined by the appended claims.

What is claimed is:

1. A self-watering dish garden comprising:
   a lower container section having an open top and closed side and bottom walls which define a reservoir to receive liquid, said lower container section defining the fluid capacity of the reservoir;
   an upper container section formed to fit on the lower container section, the upper container section having an open bottom and side walls formed near the top thereof with a supporting flange for receiving and supporting a tray adapted to contain growing medium for plant material;
   a tray having an open top and side and bottom walls which define a container adapted to receive growing medium, said tray including a top support surface engageable with said supporting flange of said upper container section for supporting said tray within said upper container section, said tray being formed with a plurality of holes in the bottom wall, the depth of said tray as defined by the side walls thereof being such that the bottom of the tray is always above the maximum liquid level in the reservoir, said side walls of said tray being formed on the inner surface thereof with a supporting flange near the top of the tray;
   a partition supported on said supporting flange of said tray, said partition including an outer rim and a plurality of retaining members which define openings in said partition;
   means formed on said tray and said partition for frictionally retaining said partition on said tray; and
   at least one water absorbing member extending from the growing medium through a hole in the tray and into said reservoir, whereby liquid is transferred from the reservoir through said at least one absorbing member to the growing medium through capillary action.

2. The self-watering dish garden of claim 1, further comprising:
   at least one posthole in the partition; and
   at least one shipping post of a size to fit in said at least one posthole, the shipping post extending upward from the partition to a point above the plant material.

3. The dish garden of claim 2, wherein a plurality of postholes are formed in said partition in the center and around the periphery thereof, and a plurality of shipping posts mounted in said postholes.

4. The dish garden of claim 2, wherein the lower container section, upper container section, tray, partition, and at least one shipping post are each formed of plastic material.

5. The dish garden of claim 4, wherein the lower container section is transparent.

6. The dish garden of claim 1, wherein the lower container section further comprises:
   a plurality of supporting feet projecting downwardly from the bottom surface of the bottom wall of the lower container section so as to position the dish garden above the supporting surface therefor, thereby inhibiting moisture transfer to the supporting surface from the container.

7. The dish garden of claim 1, wherein the upper container section further comprises an upwardly and inwardly beveled continuous wall forming a supporting surface for leaves of the plants extending downwardly below the top of the tray.

8. A self-watering dish garden comprising:
   a lower container section having an open top and closed side and bottom walls which define a reservoir to receive liquid, the top of the lower container section defining the fluid capacity of the reservoir;
   an upper container section formed to fit on the lower container section, the upper container section having side walls, an open bottom, and an open top for receiving a tray container growing medium for receiving plant material;
   a tray having side and bottom walls and an open top which define a container adapted to receive plant material in the growing medium, said tray being adapted for insertion into the upper container section and having a plurality of holes in the bottom wall, the depth of said tray being such that the bottom wall of the tray is positioned above the top of the lower container section, said tray being formed with a supporting flange near the top of the tray;
   a partition supported on said flange of said tray, said partition including an outer rim and a plurality of retaining members which define openings in said partition;
   means formed on said tray and said partition for frictionally retaining said partition on said tray, comprising a plurality of ribs formed on an upper interior surface of said tray, and a plurality of slots formed in said partition, the ribs and slots being sized so that the ribs fit frictionally in the slots, and at least one water absorbing member extending from the growing medium through a hole in the tray and into said reservoir, whereby liquid is transferred from the reservoir through said at least one absorbing member to the growing medium through capillary action.

9. A self-watering dish garden comprising:

a lower container section having an open top and closed side and bottom walls which define a reservoir to receive liquid, said lower container section defining the fluid capacity of the reservoir;

an upper container section formed to fit on the lower container section, the upper container section having an open bottom and side walls formed near the top thereof with a supporting flange for receiving and supporting a tray;

a tray having an open top and side and bottom walls which define a container, said tray including a top support surface engageable with said supporting flange of said upper container section for supporting said tray within said upper section, said tray being formed with a plurality of holes in the bottom wall, the depth of said tray as defined by the side walls thereof being such that the bottom wall of the tray is positioned above lowermost ends of the side walls of the upper container section so that the bottom wall of its tray is always above the maximum liquid level in the reservoir, said side walls of said tray being formed on the inner surface thereof with a supporting flange near the top of the tray;

a partition supported on said supporting flange of said tray, said partition including an outer rim and a plurality of retaining members which define openings in said partition;

means formed on said tray and said partition for frictionally retaining said partition on said tray; and wherein at least one of said holes formed in the bottom wall of said tray has a diameter smaller than the diameter of the rest of the holes, the smaller diameter hole being located approximately directly below at least one of the openings in the partition, wherein the openings in the partition are circular openings, and further comprising a pot with growing medium and plant material, the pot including an upper section with an outside diameter slightly larger than an inside diameter of the circular openings in the partition, and a lower section with a diameter smaller than the inside diameter of the circular openings in the partition, the pot having a depth measured from a bottom of the pot to a transition between the upper and lower sections of the pot, the pot depth being less than a depth of the tray measured from the bottom wall of the tray to the supporting flange of the tray, said pot having a at least one hole in the bottom and having at least one water-absorbing member extending into the pot through said at least one hole in the bottom of the pot and extending downward through the said smaller diameter hole in the bottom of the tray and thence toward the bottom wall of the lower container section, whereby liquid is transferred from the reservoir through the absorbing member to the pot through capillary action.

10. A self-watering dish garden comprising:

a lower container section having closed side and bottom walls which define a reservoir to receive liquid, the section being open at a top, the top of the lower container section defining the fluid capacity of the reservoir;

an upper container section formed to fit on the lower container section, the upper container section having side walls, an open bottom, and an open top for receiving a tray containing growing medium for receiving plant material;

a tray having side and bottom walls and an open top which define a container adapted to receive plant material in the growing medium, said tray being adapted for insertion into the upper container section and having a plurality of holes in the bottom wall, the depth of said tray being such that the bottom wall of the tray is positioned above the top of the lower container section, said tray being formed with a supporting flange near the top of the tray;

a partition supported on said flange of said tray, said partition including an outer rim and a plurality of retaining member which define circular openings in said partition;

means formed on said tray and said partition for frictionally retaining said partition on said tray;

at least one water absorbing member extending from the growing medium through a hole in the tray and into said reservoir, whereby liquid is transferred from the reservoir through said at least one absorbing member to the growing medium through capillary action; and a port with growing medium and plant material, the pot including an upper opening having an inside diameter which is larger than the inside diameter of the circular openings in the partition, whereby when the growing medium and plant material is extracted in substantially one piece form the pot, and pressed into the circular opening in the partition, the growing material elastically returns to the diameter of the inside of the pot, thereby preventing the growing material from dislodging from the tray in the event the dish garden is inverted.

* * * * *